United States Patent [19]

Caron

[11] Patent Number: 5,060,464
[45] Date of Patent: Oct. 29, 1991

[54] MECHANISM FOR ADJUSTING THE GAP BETWEEN THE STRIPPER PLATES OF A HARVESTER

[76] Inventor: Norm Caron, R.R. #1, Grand Pointe, Ontario, Canada, N0P 1S0

[21] Appl. No.: 598,521

[22] Filed: Oct. 16, 1990

[51] Int. Cl.$^5$ ............................................. A01D 45/02
[52] U.S. Cl. .......................................... 56/62; 56/64; 56/119
[58] Field of Search ................. 56/62, 64, 51, 66, 93, 56/98, 99, 119, 327.1, 328.1

[56] References Cited

U.S. PATENT DOCUMENTS

| | | | |
|---|---|---|---|
| 3,707,833 | 1/1973 | Sutton | 56/104 |
| 3,858,384 | 1/1975 | Maiste et al. | 56/104 |
| 4,531,351 | 7/1985 | Sousek | 56/98 |

Primary Examiner—Terry L. Melius
Attorney, Agent, or Firm—Gowling, Strathy & Henderson; Joseph A. Day

[57] ABSTRACT

A mechanism for adjusting the stalk-receiving gaps between stripper plates in a produce harvester. The mechanism is adapted for use in harvester where a number of pairs of stripper plates are utilized, and where a space is formed between adjacent pairs of stripper plates, and a stalk-receiving gap is formed between the stripper plates within each pair. The mechanism permits all stalk-receiving gaps in the harvester to be adjusted simultaneously and to the same degree. These gaps are adjusted from both sides allowing for optimum centering of the gap to engage the stalks. The mechanism comprises a reciprocating shaft disposed so as to move substantially perpendicular to the movement of the harvester. A number of rotating shafts are connected to the reciprocating shaft and these are disposed within the spaces between adjacent pairs of stripper plates. The rotating shafts are disposed substantially at right angles to the movement of the harvester. Each rotating shaft is connected to the stripper plates on either side of the space between the adjacent pairs of plates by linkage arms. As the reciprocating shaft is moved, the rotating shafts rotate or roll, causing the stripper plates on either side of the spaces between adjacent pairs to move towards or away from each other, depending on the direction of movement of the reciprocating shaft. This movement causes the stalk-receiving gaps to be increased or decreased in size.

10 Claims, 6 Drawing Sheets

MECHANISM FOR ADJUSTING THE GAP BETWEEN THE STRIPPER PLATES OF A HARVESTER

BACKGROUND OF THE INVENTION

This invention relates generally to a mechanism for adjusting the stalk-receiving gap between the stripper plates of a produce harvester, and more specifically to a mechanism for adjusting the stalk-receiving gap in all pairs of stripper plates in a corn harvester simultaneously and to the same degree.

SUMMARY OF THE INVENTION

The mechanism of the present invention is adapted to adjust the stalk-receiving gap between the stripper plates of a produce harvester, which plates detach the fruit from the plant stalks. The mechanism is adapted for use in a harvester of the type which has a plurality of pairs of stripper plates and although it is described specifically with reference to corn harvesters, it may be utilized in any type of harvester which operates on the same principle.

Corn harvesters may have anywhere from one pair to twelve pairs of stripper plates. These stripper plates are disposed substantially parallel to each other and to the direction of movement of the harvester. The plates are arranged so that pairs of plates are disposed a distance from each other so that a space is formed between adjacent pairs. Within each pair, the plates are disposed a distance from each other so that a stalk-receiving gap is formed therebetween. The stalk of the plant enters the stalk-receiving gap and is moved between the plates by a gathering belt disposed on the stripper plates on either side of the gap. The stalk is pulled downwardly by knife rollers disposed below the stripper plates and when the ear of corn engages the stripper plates, the ear of corn is stripped by the knife rollers.

It is often necessary to adjust the size of the stalk-receiving gap to ensure that the corn stalks are severed at a point which causes the least damage to the corn ears. If the stalk-receiving gaps are too large, the ears will be pulled too far into the gaps and the lowermost kernels of corn will be damaged. If, on the other hand, the gaps are too small, the stalks may not even be able to enter the gaps.

The device of the present invention allows for the improved ajustment of the stalk-receiving gaps so that corn stalks may be engaged to sever the stalks at a height which tends to cause the least damage to the corn ears.

In the present invention, a mechanism is provided for adjusting the size of the stalk-receiving gaps by moving both the stripper plates within a pair either towards or away from each other. This tends to result in more precise centering of the stalk-receiving gap and therefore in better harvesting of the crop.

The device of the present invention comprises a reciprocating means attached to the harvester and adapted for reciprocal movement substantially perpendicular to the direction of movement of the harvester. A plurality of rotating means are attached to the reciprocating means. Each rotating means is disposed substantially parallel to the direction of movement of the harvester and within the space between adjacent pairs of stripper plates. Each rotating means is adapted for rotating about its axis in response to the movement of the reciprocating means. With respect to each space, linkage means are attached at one end to the rotating means and at the other end to the stripper plates disposed on either side of the space. The linkage means are configured so that as the rotating means rotates, the stripper plates disposed on either side of the space are either drawn closer together or are moved further apart. The direction of rotation of the rotating means is dependent on the direction of movement of the reciprocating means.

As the stripper plates disposed on either side of the spaces are drawn closer together, the stalk-receiving gap within each pair of plates increases in size. When the stripper plates on either side of the spaces are forced apart, the stalk-receiving gap within each pair of plates decreases in size. All the stalk-receiving gaps increase or decrease in size simultaneously and to the same degree.

In the preferred embodiment of the invention each rotating means is connected to the reciprocating means by a connector means. The connector means comprises a pin, fixedly mounted on the reciprocating means, which pin is engaged by the limbs of a substantially Y-shaped member attached to the rotating means. Each pin is disposed in a space between adjacent pairs of stripper plates. The limbs of the Y-shaped member engage the pin, but are free to rotate about the pin during movement of the reciprocating means. As the reciprocating means moves, the pin moves in the same direction, and the Y-shaped member describes an arcuate path as the limbs rotate about the pin. The movement of the Y-shaped member causes a rotational or rolling movement of the rotating member, causing the stripper plates on either side of each space to be moved either towards or away from each other. This results in the size of the stalk-receiving gaps within every pair of stripper plates being altered simultaneously and to the same degree. The stalk-receiving gaps are also adjusted from both sides which allows for better centering of the gaps for harvesting of the corn.

In the preferred embodiment of the invention the reciprocating means is moved by a single hydraulic cylinder.

BRIEF DESCRIPTION OF THE DRAWINGS

The preferred embodiment of the invention will now be described in more detail with reference to the following drawings, in which.

DETAILED DESCRIPTION OF THE PREFERRED EMBODIMENT

Figure 1:
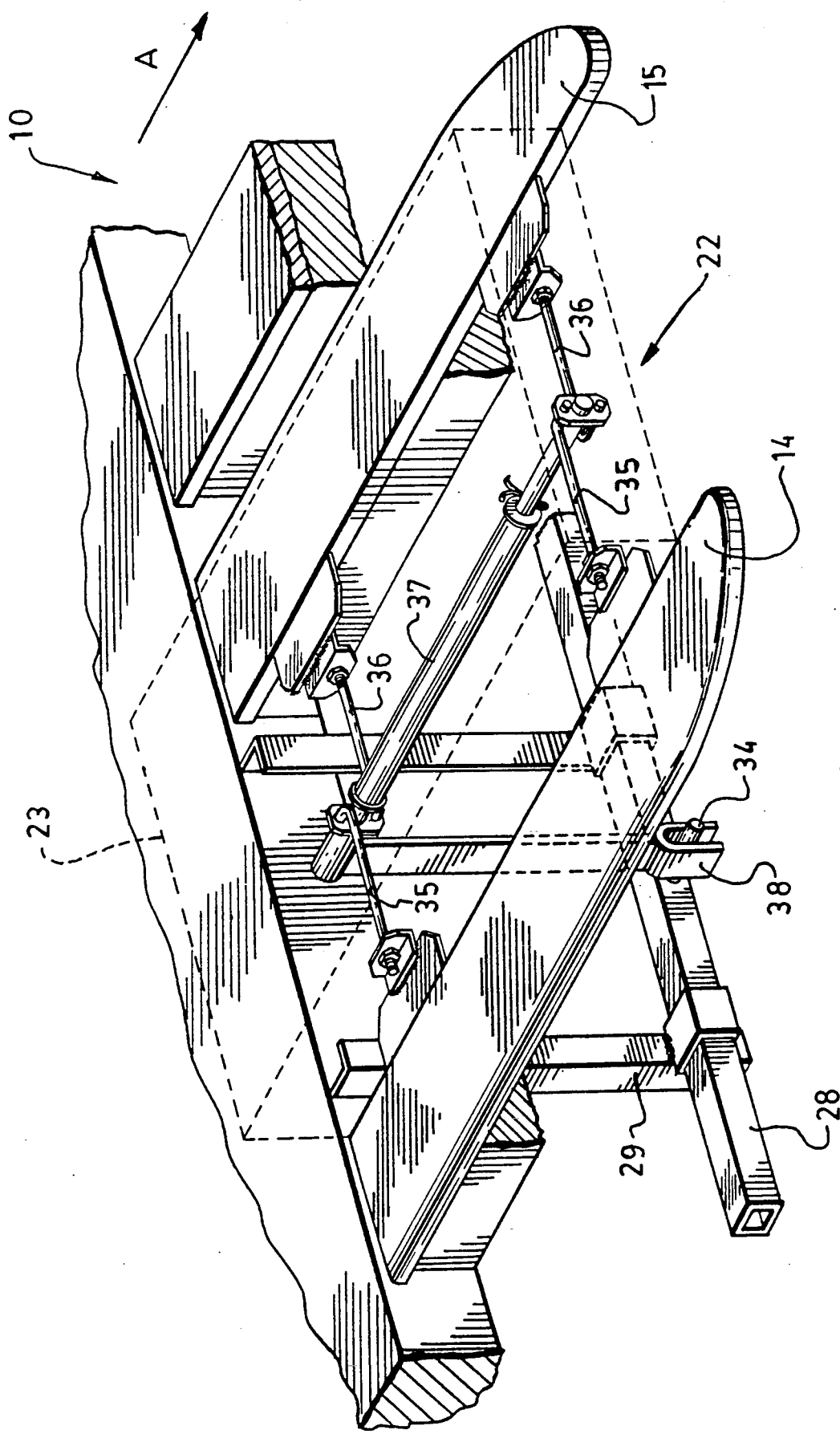
FIG. 1 is a perspective view of a harvester with a cutout showing the position of the stripper plates and the adjustment mechanism.
Figure 2:
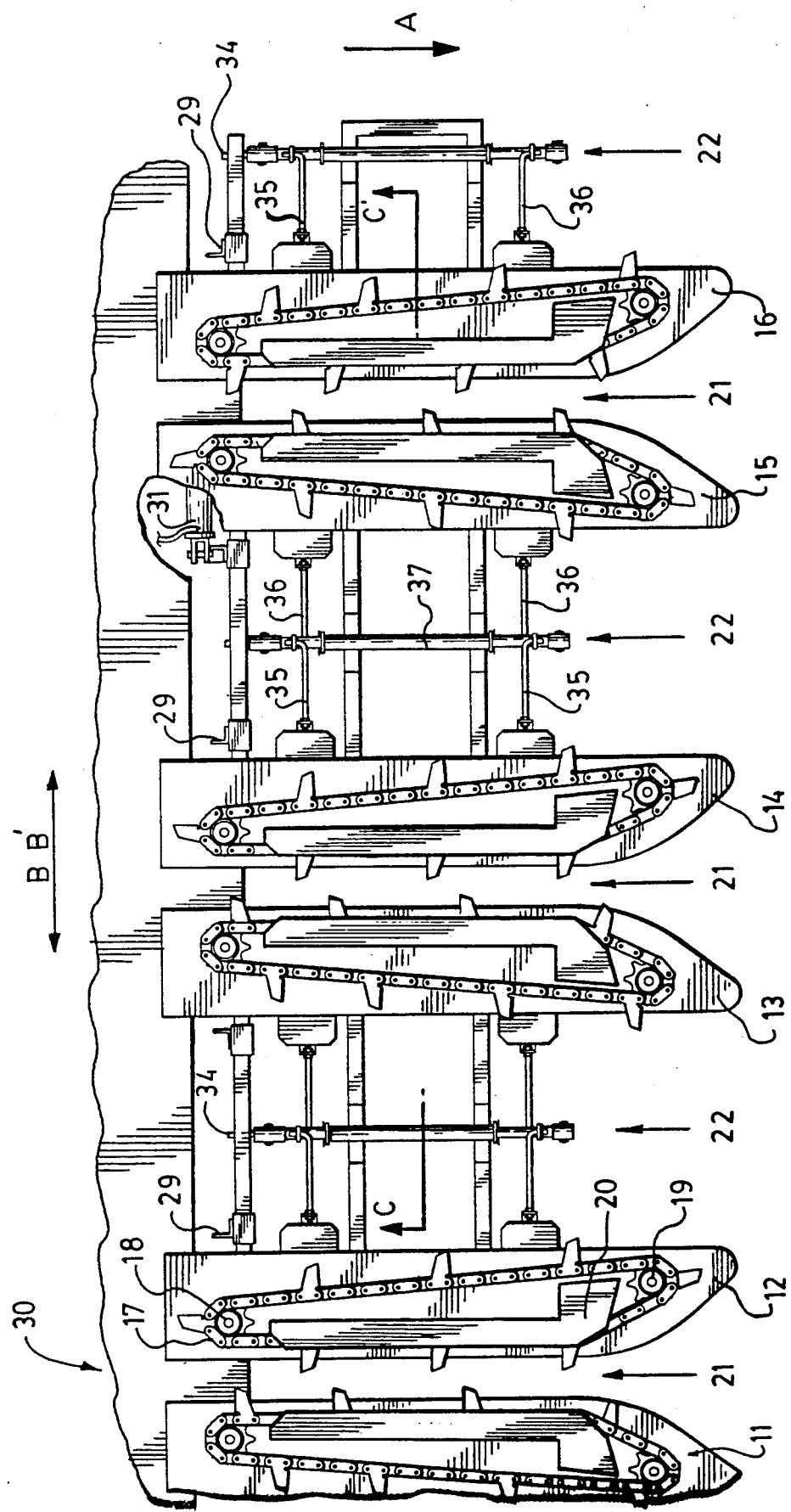
FIG. 2 is a plan view of two pairs of stripper plates showing the adjustment mechanism.

Referring to FIGS. 1 & 2, there is shown a corn harvester 10 having a plurality of pairs of stripper plates 11,12 13,14 15,16 for detaching corn ears, or cobs, from corn stalks. The stripper plates are aligned substantially parallel to each other and to the direction of movement of the corn harvester, shown by arrow A in these Figures.

On each stripper plate, 13 for example, a gathering belt 17 is entrained around a drive sprocket 18 and an idler sprocket 19. The gathering belt 17 is guided around a guide plate 20. Tension is maintained on the gathering belt 17 by way of a spring assembly (not shown) acting on the idler sprocket 19.

As can be seen in FIG. 2, the stripper plates are grouped in pairs and within each pair the plates are disposed a distance from each other so that a stalk-receiving gap 21 is formed therebetween.

Adjacent pairs of stripper plates are disposed a distance from each other and a space 22 is formed between each adjacent pair, i.e. between 12 & 13, and 14 & 15. A space 22 is similarly formed between the outermost stripper plates 11 and 16 and the stripper plate or other part of the harvester lying outwardly adjacent those plates. The adjacent plates of each adjacent pair, together with the inclusive space, are protected by a cover, e.g. plates 14 & 15 and the inclusive space 22 are protected by the cover 23. This is shown in dotted lines in FIG. 1.

Figure 3:
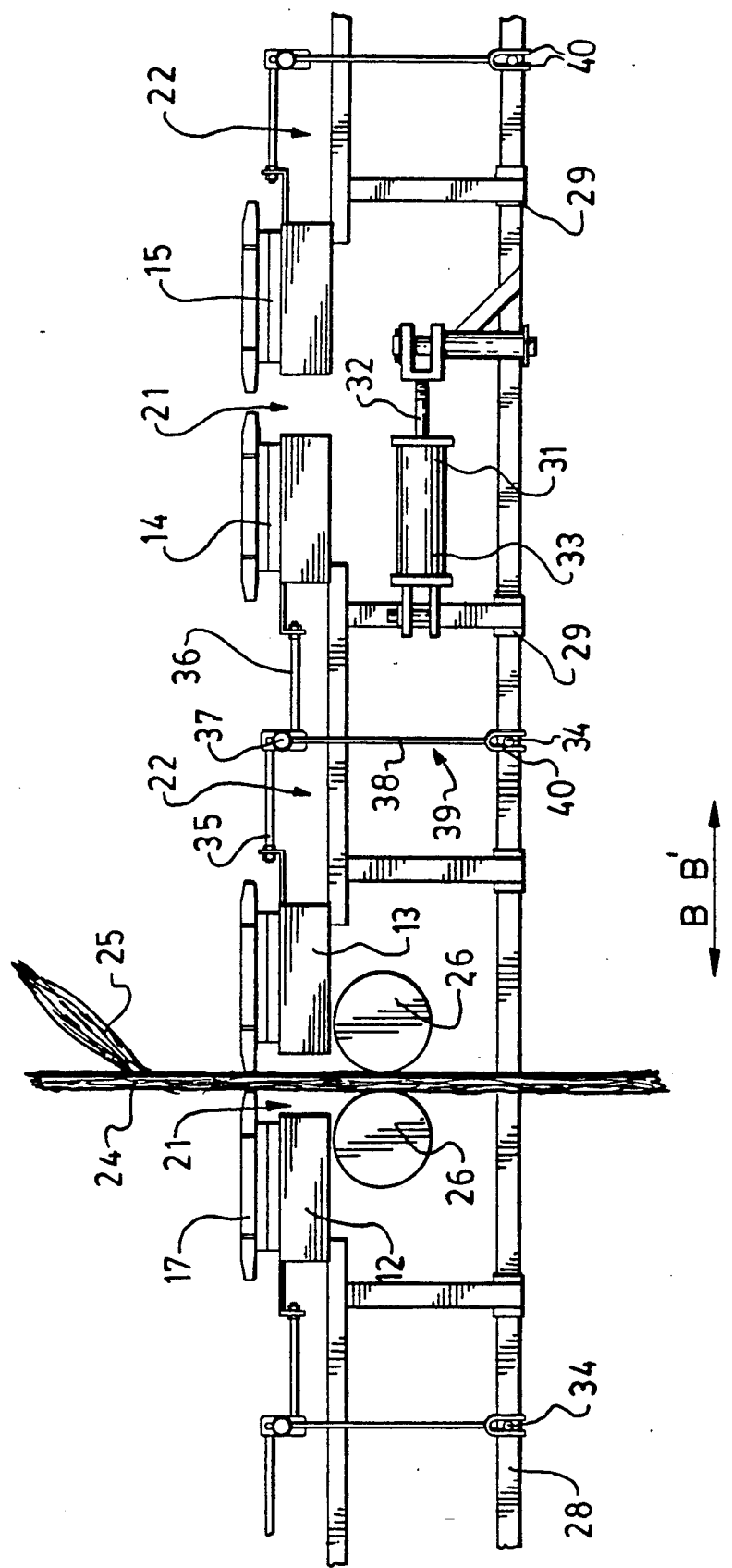
FIG. 3 is a front view through line CC' of FIG. 2.

Referring to FIG. 3, as the harvester moves through the corn, corn stalks 24 pass into the stalk-receiving gaps 21, and are moved through the stalk-receiving gaps 21 by the gathering belts 17. The ears 25 are held upright on the stripper plates as the stalks 24 are pulled downwardly by knife rollers 26 and are severed.

When harvesting corn it is often necessary to adjust the size of the stalk-receiving gap 21 by reason of variations in stalk sizes to ensure that the corn stalks 24 are severed at a point which causes the least damage to the corn ears. If the stalk-receiving gaps 21 are too large, the ears 25 will be pulled too far into the gaps and the lowermost kernels of corn will be damaged. If, on the other hand, the gaps are too small, the stalks may not even be able to enter into the gaps for severing.

The device of the present invention allows for the ajustment of the stalk-receiving gaps 21 so that corn stalks 24 may be engaged to sever the stalks 24 at a height which tends to cause the least damage to the corn ears 25.

Referring to FIGS. 2 & 3 there is shown a tube 28, square in cross-section, which is reciprocally movable in a direction substantially perpendicular to the movement of the corn harvester. The tube 28 is supported in position by a plurality of brackets 29 which are fixedly connected to the frame 30 of the harvester. The tube is free to move within the brackets and is moved by an hydraulic cylinder 31. The movement of the tube 28 is shown by BB' in these Figures.

As is best shown in FIG. 3, the piston 32 of the cylinder 31 is fixedly connected to the tube 28, while the stationary part 33 of the cylinder 31 is fixedly connected to the frame 30 of the harvester. Consequently, when the piston 32 is moved, the tube 28 is moved with it.

A plurality of pins 34 are disposed along the length of the tube 28 in the spaces 22 between adjacent pairs of stripper plates. The pins 34 are fixedly mounted on the tube 28 and they consequently move when the tube 28 is moved.

A pair of linkage arms 35,36 are disposed a distance from each other on each stripper plate, and are fixedly connected at one end to the stripper plate and at the other end to a shaft 37 disposed in the space 22. The shaft 37 is fixedly connected to the shank 38 of a tuning-fork-shaped or substantially Y-shaped member 39. The limbs 40 of the Y-shaped member 39 engage the pin 34, but are free to rotate about the pin as the tube 28 is moved. This causes the Y-shaped member 39 to move in an arc as the tube 28 is moved. The movement of the Y-shaped member 39 causes the shaft 37 to rotate or roll. The linkage arms 35,36 are configured to connect to the shaft 37 in such a manner that as the shaft rotates, the stripper plates on either side of the space 22 are either pulled towards each other or forced away from each other, depending on the direction of movement of the tube 28. In the preferred embodiment of the invention the linkage arms 35,36 are substantially J-shaped and the hooked portion of each arm is fixedly connected to the shaft 37. As the space 22 is altered in size the stalk-receiving gap 21 is correspondingly altered in size.

Figure 4:
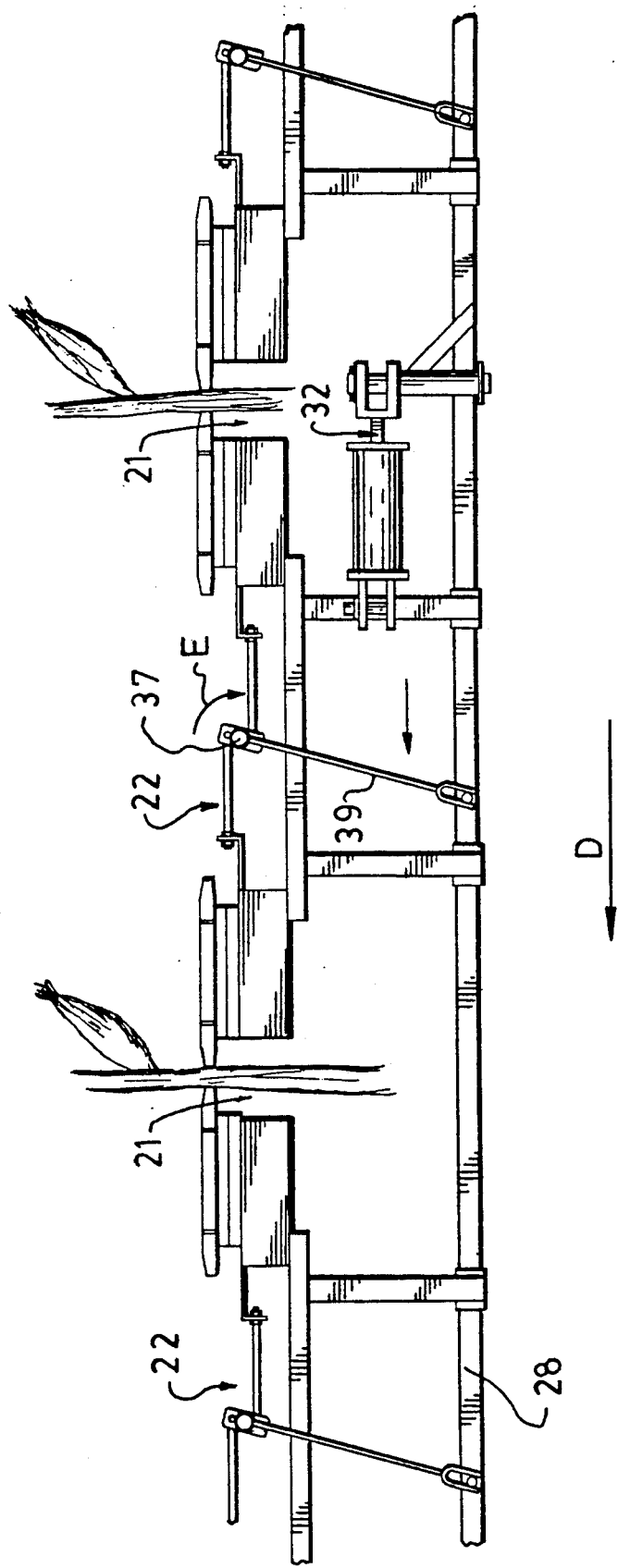
FIG. 4 is a front view of the two pairs of stripper plates showing the adjustment mechanism in action.

In use the device of the present invention functions as follows:

Referring to FIG. 4, if it is desired to increase the size of the stalk-receiving gaps 21, the hydraulic cylinder may be activated in the conventional manner from a convenient location in the harvester, the piston 32 is thereby moved in the direction of the arrow D. This causes the tube 28 to be moved in the same direction. Movement of the tube 28 causes the Y-shaped members 39 to move in an arcuate manner, thereby causing the shafts 37 to rotate in the direction shown by the arrow E in the same Figure. The rotation or rolling of the shafts 37 draws the plates on either side of the spaces 22 closer to each other. This change in the position of the plates increases the size of the stalk-receiving gaps 21.

Figure 5:
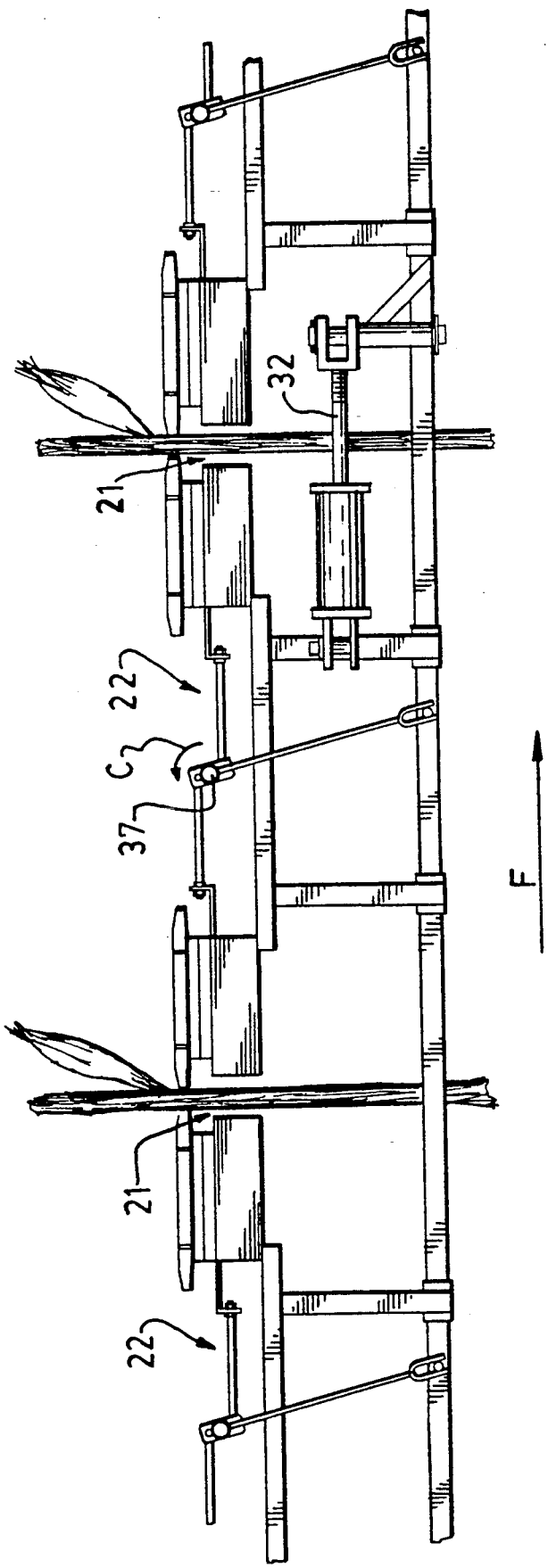
FIG. 5 is a front view showing the adjustment mechanism in action when the reciprocating means is moved in the opposite direction from that shown in FIG. 4.

If it is desired to decrease the size of the stalk-receiving gaps 21, the cylinder will be activated in the conventional manner from a convenient location in the harvester so that the piston 32 is moved in the direction of arrow F, as is shown in FIG. 5. This causes the tube 28 to be moved in the same direction. This causes the Y-shaped members 39 to move in an arcuate manner in the opposite direction from that described above, which in turn causes the shafts 37 to rotate in the direction shown by the arrow G. The rotation of the shafts 37 forces the plates further apart, thereby decreasing the size of the stalk-receiving gaps 21.

Because all the pins 34 are mounted on the same tube 28 and consequently all move at the same time and to the same degree, the size of all stalk-receiving gaps 21 within the stripper plate pairs will be altered simultaneously and to the same degree.

The mechanism also causes the stalk-receiving gaps 21 to be altered from both sides therefore providing for better centering of the gap for engagement with the stalks and consequently improved harvesting by the harvester.

Figure 6:
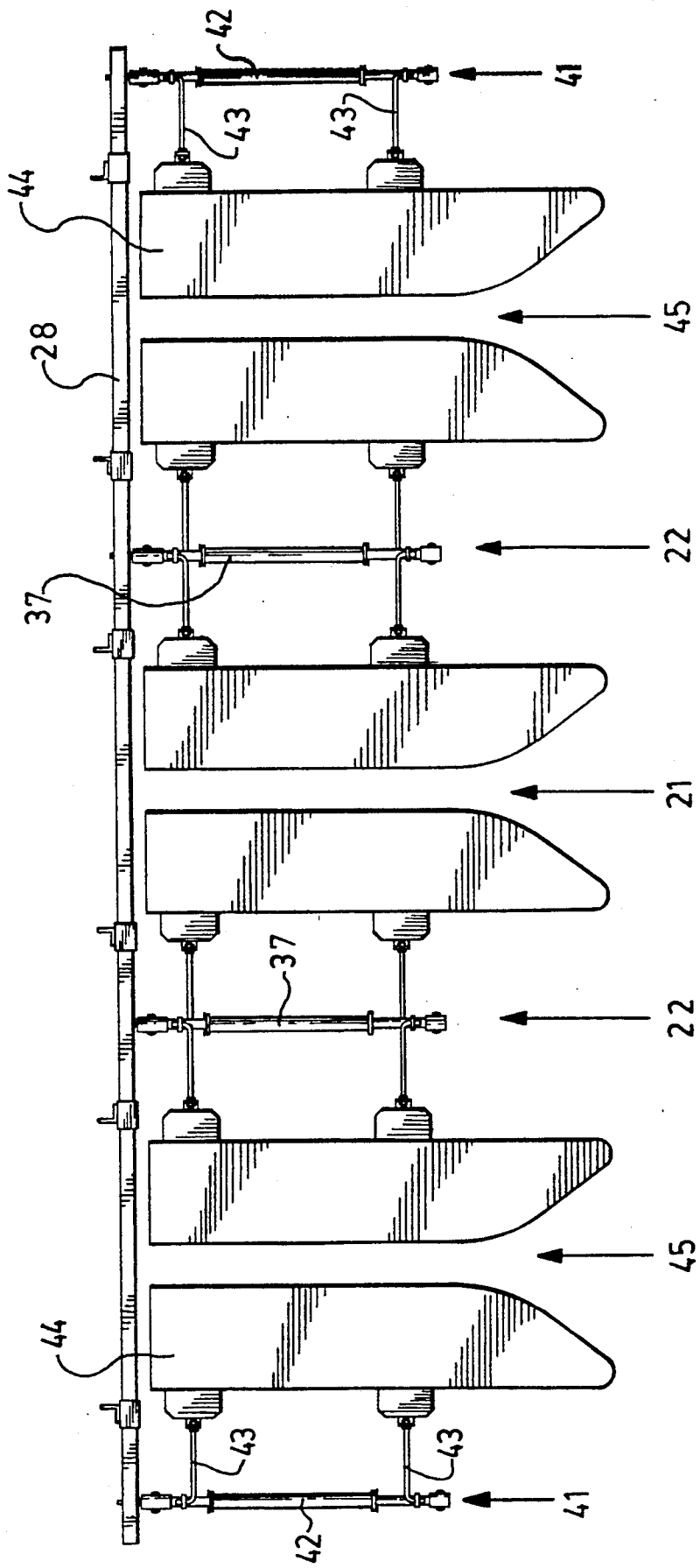
FIG. 6 is a plan view showing a single functioning adjustment mechanism disposed in the space between the stripper plates at the end of the row of pairs of plates and the sides of the harvester.

As shown in FIG. 6, in harvesters where the pairs of stripper plates are disposed alongside one another so as to form a row, a space 41 is formed between the plates on the ends of the row and the frame of the harvester. A single functioning adjustment mechanism is utilized in the space 41. A rotating shaft 42 is disposed within the space 41 and is connected to the tube 28 in the same manner as the other shafts 37. Only one set of linkage arms 43 are connected to the shaft 42 and the plates 44 at the ends of the row. As the shaft 42 rotates, the linkage arms draw the stripper plates 44 toward the shaft 42 or push it away from the shaft 42 and the stalk-receiving gap 45 is thereby altered in size.

It is possible that the plate 44 could be fixed or stationary in which case a single functioning adjustment mechanism would not be required to adjust the size of the stalk-receiving gap 45.

Variations in the present invention will be obvious to those skilled in the art, and such obvious variations are contemplated to fall within the scope of the present invention.

The embodiments of the invention in which an exclusive property or privilege is claimed are defined as follows:

1. In a harvester having a plurality of pairs of stripper plates for detaching the fruit from the plant stalks, said stripper plates being disposed substantially parallel to each other and to the direction of movement of the harvester; the stripper plates within each pair being disposed a distance from each other so that a stalk-receiving gap is formed therebetween; and adjacent pairs of stripper plates being disposed a distance from each other so that a space is formed therebetween; a mechanism for adjusting the size of the stalk-receiving gaps comprising:

a reciprocating means attached to the harvester and adapted for reciprocal movement substantially perpendicular to the direction of movement of the harvester;

a plurality of rotating means attached to the reciprocating means, each rotating means being disposed substantially parallel to the direction of movement of the harvester and within a space between adjacent pairs of stripper plates; each rotating means being adapted for rotational movement about its axis in response to the movement of the reciprocating means;

linkage means attached at one end to a rotating means and at the other end to the stripper plates disposed on either side of the space;

said linkage means being configured so that as the rotating means rotate, the stripper plates disposed on either side of every space are either drawn closer to each other or moved further apart from each other, depending on the direction of movement of the reciprocating means, thereby respectively either increasing or decreasing the size of all the stalk-receiving gaps simultaneously and to the same degree.

2. The stalk-receiving gap adjustment mechanism as defined in claim 1, wherein each rotating means is connected to the reciprocating means by a connector means, and said connector means comprises:

a pin fixedly mounted on the reciprocating means, said pin extending from the reciprocating means and being disposed in a space between adjacent pairs of stripper plates;

a substantially Y-shaped member, the shank of which is fixedly attached to the rotating means and the limbs of which are adapted to engage said pin; said limbs being free to rotate about the pin during movement of the reciprocating means;

so that as the reciprocating means moves, the pins move in the same direction and the Y-shaped members will describe an arcuate path, and the rotating means will rotate about their axes causing the stripper plates disposed on either side of the spaces to be either drawn closer to each other or moved further apart from each other, depending on the direction of movement of the reciprocating means; thereby respectively either increasing or decreasing the size of the stalk-receiving gaps simultaneously and to the same degree.

3. The stalk-receiving gap adjustment mechanism as defined in claims 1 or 2, wherein the reciprocating means is reciprocated by way of an hydraulic cylinder.

4. The stalk-receiving gap adjustment mechanism as defined in claims 1 or 2, wherein the size of the stalk-receiving gaps is altered by both stripper plates disposed on either side of the stalk-receiving gaps being moved either towards or away from each other.

5. A stalk-receiving gap adjustment mechanism as defined in claims 1 or 2, where the pairs of stripper plates are disposed alongside one another so as to form a row and an end-space is formed between the plates at the ends of the row and adjacent the frame of the harvester, and a single-functioning rotating means is disposed in each said end-space and is connected to said reciprocating means so as to move the plates at the ends of the row either towards or away from the frame of the harvester in response to the movement of the reciprocating means.

6. A stalk-receiving gap adjustment mechanism as defined in claim 1 wherein the harvester is a corn harvester adapated to detach ears of corn from the plant stalks.

7. In a corn harvester having a plurality of pairs of stripper plates for detaching corn ears from stalks of corn, said stripper plates being disposed substantially parallel to each other and to the direction of movement of the harvester; the stripper plates within each pair being disposed a distance from each other so that a stalk-receiving gap is formed therebetween; and adjacent pairs of stripper plates being disposed a distance from each other so that a space is formed therebetween; a mechanism for adjusting the size of the corn-stalk receiving gaps comprising:

a tube mounted on the harvester, said tube being adapted for reciprocal movement substantially perpendicular to the movement of the harvester;

a plurality of pins fixedly mounted on said tube, each pin being disposed in a space between adjacent pairs of stripper plates;

a plurality of substantially Y-shaped members, the limbs of each member being adapted for engagement with a pin, the limbs being free to rotate about the pin during movement of the reciprocating means;

a shaft fixedly connected to the shank of each Y-shaped member, said shafts being disposed within a space between adjacent pairs of stripper plates and substantially parallel to the direction of movement of the harvester;

at least one pair of arms fixedly connected at one end to the shaft and at the other end each to a stripper plate disposed on either side of the space, said arms being disposed substantially perpendicular to the direction of movement of the harvester and substantially parallel to the direction of movement of the tube;

so that as the tube moves, the pins will move in the same direction, the Y-shaped members will describe an arcuate path, and the shafts will rotate about their axes causing the stripper plates disposed on either side of every space to be either drawn towards each other or moved further apart from each other, depending on the direction of movement of the tube, thereby respectively either increasing or decreasing the size of all the stalk-receiving gaps simultaneously and to the same degree.

8. The stalk-receiving gap adjustment mechanism as defined in claim 7, wherein the tube means is reciprocated by way of an hydraulic cylinder.

9. The stalk-receiving gap adjustment mechanism as defined in claims 6, 7 or 8, wherein the size of the stalk-receiving gaps are altered by both stripper plates disposed on either side of the stalk-receiving gaps being moved towards or away from each other, depending on the direction of movement of the reciprocating means.

10. A stalk-receiving gap adjustment mechanism as defined in claims 6, 7 or 8, where the pairs of stripper plates are disposed alongside one another so as to form a row and an end-space is formed between the plates at the ends of the row and adjacent frame of the harvester, and a single-functioning shaft is disposed in each said end-space and is connected to said tube so as to move the plates at the ends of the row either towards or away from the frame of the harvester in response to the movement of the tube.

* * * * *